United States Patent
Montane Condemines

(10) Patent No.: US 6,628,784 B1
(45) Date of Patent: Sep. 30, 2003

(54) CELLULAR TELEPHONE WITH DEVICE TO PROTECT AGAINST RADIATION GENERATED DURING ITS USE

(75) Inventor: Miquel Montane Condemines, Barcelona (ES)

(73) Assignee: Consulting Comunicacio I Disseny, S.L., Barcelona (ES)

( * ) Notice: Subject to any disclaimer, the term of this patent is extended or adjusted under 35 U.S.C. 154(b) by 0 days.

(21) Appl. No.: 09/719,386

(22) PCT Filed: Jun. 21, 1999

(86) PCT No.: PCT/ES99/00182

§ 371 (c)(1),
(2), (4) Date: Feb. 5, 2001

(87) PCT Pub. No.: WO99/67935

PCT Pub. Date: Dec. 29, 1999

(30) Foreign Application Priority Data

Jun. 22, 1998 (ES) .......................... P 9801294

(51) Int. Cl.[7] ............................... H04M 1/00
(52) U.S. Cl. ............. 379/433.01; 379/438; 379/433.02; 379/433.03
(58) Field of Search ................. 379/433.01, 433.04, 379/433.07, 438; 455/90, 575

(56) References Cited

U.S. PATENT DOCUMENTS 5,265,158 A * 11/1993 Tattari ................... 379/433.07

FOREIGN PATENT DOCUMENTS

| DE | 4239784 | 6/1994 |
|---|---|---|
| DE | 4330436 | 5/1995 |
| DE | 19633291 | 2/1998 |
| DE | 29508792 | 9/1998 |
| EP | 851596 | 7/1998 |
| GB | 2266997 | 11/1993 |
| WO | WO 9629755 | 6/1996 |
| WO | WO 9728575 | 8/1997 |
| WO | WO 9823116 | 5/1998 |

* cited by examiner

Primary Examiner—Jack Chiang
(74) Attorney, Agent, or Firm—Sughrue Mion, PLLC

(57) ABSTRACT

Cellular telephone with a device to protect against radiation generated during its use. It is divided into two groups: a radiation receiver-emitter group (6), consisting of the receiver, the emitter, the antenna (2) and a telescopically extendable support handle for the user, and a personal communication group (7), consisting of the speaker (3); the microphone (4); the keypad (12); the screen (17); and the said casing (5), both of the groups being connected one another via cable or wirelessly. During communication, the radiation receiver-emitter group (6) is distanced from the personal communication group (7), so that the power density of the radiation energy that reaches the personal communication group, and therefore the user, van be less than 0.1 microW/cm$^2$. In the absence of communication, the emitter group can be inserted in a snug manner in a housing provided for that purpose in the casing. It can be used either in individual or collective usages.

6 Claims, 5 Drawing Sheets

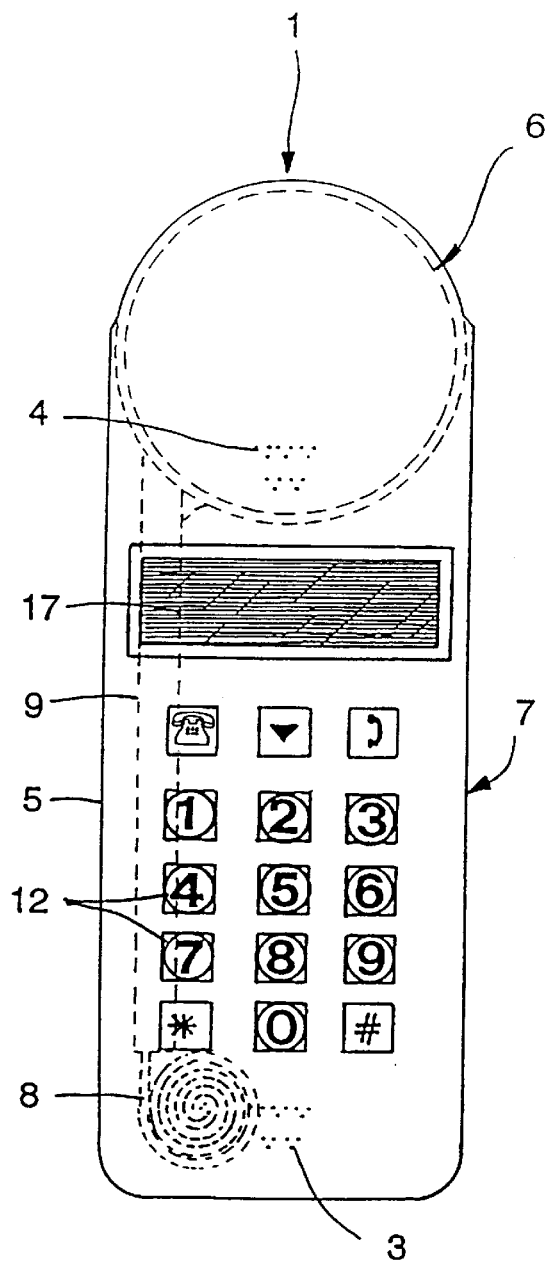
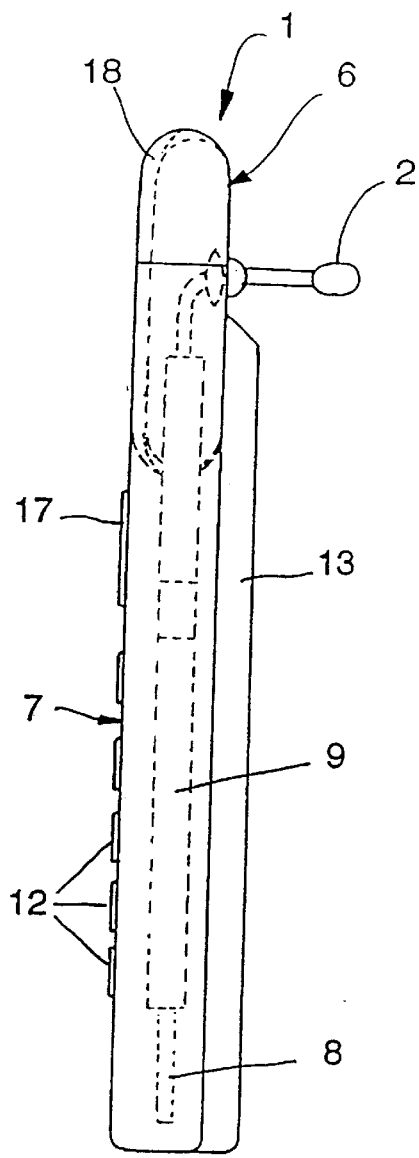
FIG. 1          FIG. 2

FIG. 6
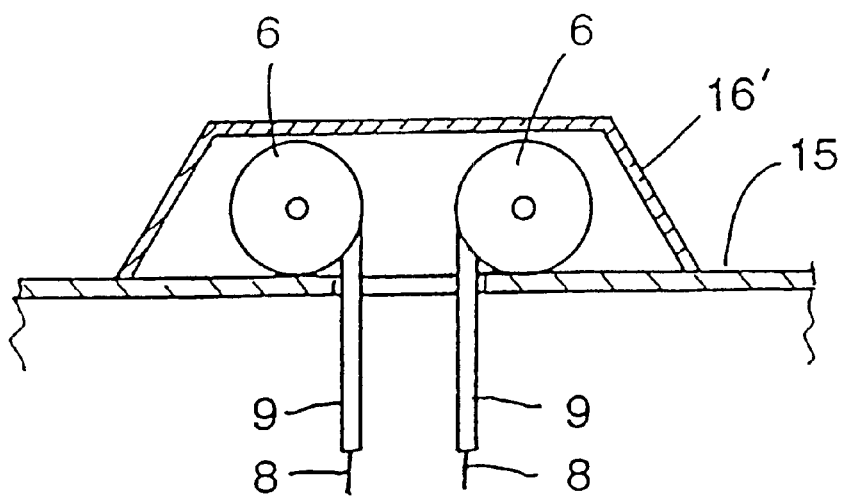
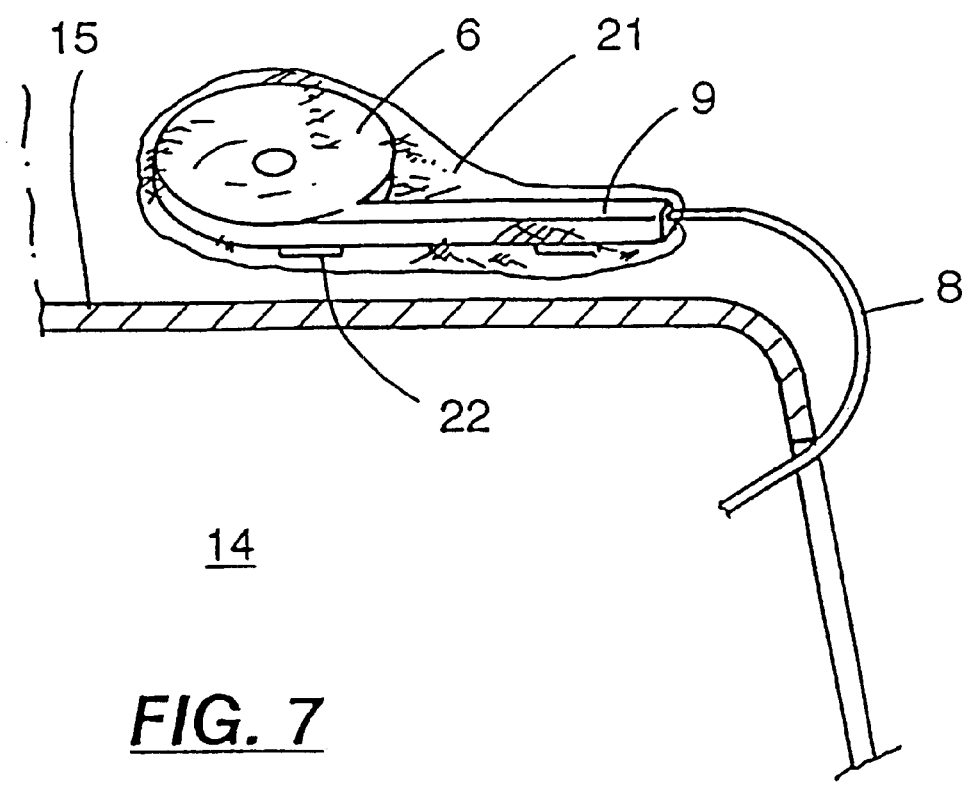
FIG. 7

CELLULAR TELEPHONE WITH DEVICE TO PROTECT AGAINST RADIATION GENERATED DURING ITS USE

This application is a 371 of PCT/ES99/00182 filed Jun. 21, 1999.

TECHNICAL FIELD OF THE INVENTION

The present invention refers to a cellular telephone with a device to protect against radiation generated during its use, of the type comprising a device for receiving electromagnetic radiofrequency waves and/or microwaves; a support handle for the user; a device for emitting electromagnetic radiofrequency waves and/or microwaves; an antenna; a speaker element; a microphone; a keypad; a screen and a casing, the said speaker element, the said microphone, the said screen and the said keypad forming a fixed group of elements, or personal communication group, solid to the casing of the cellular telephone, all this adapted in such a manner that during conversation, the personal communication group can be manipulated by the user contiguous to the same, spaced apart from any microwave emitter a distance sufficient so that the power density of the radiation energy that reaches the personal communication group, and therefore the user, is less than a predetermined maximum value, maintaining communication in a cordless fashion.

STATE OF THE ART

The use of cellular phones has rapidly increased and is today accepted in a very popular fashion, since it is a discreet, fast and simple means of communication and can be even more economical than the classic telephone.

However, cellular telephone use implies a number of drawbacks.

Effectively, reception and emission of messages implies generating, transmitting and capturing electromagnetic waves in the form of microwave and electromagnetic radiation, with a typical frequency of between 900 MHz and 1,800 MHz and a conversation cut-off frequency of around 217 times per second.

The only existing European regulation regarding radiofrequency radiation is regulation CENELEC ENV 50166-2, published in November 1966, that establishes exposure to radiofrequency fields, "Field intensities, and power densities are valid for fields where people are not present". For fields where people are not present, it dictates a power density level of 450 microW/cm$^2$.

The strict reading of regulation CENELEC ENV 50166-2 enables calculation by application of the power flow density formula:

$$\Phi = \frac{Pire(W)}{4\pi d(m)^2} \times \frac{1}{l_{wxt}}(W/m^2),$$

and reflected in Table I are the distances from the user to the emitter, for two power levels. It is considered that at this radiation level there exists grave risk to the user.

TABLE I

| EMITTER POWER | 0.5 W | 1 W |
|---|---|---|
| DISTANCE OF SEVERE RISK TO THE USER, IN METERS | 0.08 | 0.12 |

Although current knowledge does not provide evidence of the risk assumed to the user from exposure to cellular telephone radiofrequency, there currently exists the grave suspicion that this can promote alterations in the cerebral electrical field, in the calcium ion and in cellular growth rate (cancer), in enzymatic activity and in the DNA genes. The absence of conclusive studies on the question is, without a doubt, due to the slow development of the diseases that are believed to be associated to the use of these cellular telephones.

It is known among other things, according to the publication "Fact Sheet No. 183: Electromagnetic Fields and Public Health" of October 1997 of the WHO, that the power density from radiofrequency radiation received from natural source fields is around $10^{-3}$ microW/cm$^2$, and that only 1% of the population in the largest U.S. cities receives radiation coming from cellular telephone repeater stations of more than 1 microW/cm$^2$ of the same.

The physicist and doctor, Dr Lebrecht von Klitzing ("Ecological Test", 9$^{th}$ September, 1994), has verified in an experiment carried out using volunteers, that after being subjected during 15 or 20 minutes to high frequency radiation, some peaks and curves appear in the electroencephalogram, that until the present, had not been observed by any doctor. These peaks produced as a reaction in the brain continued to be manifest a long time after the cellular telephone radiofrequency had been disconnected.

Before such evidence, there have been attempts to find a remedy to the risk derived from the use of cellular telephones.

In this direction patents have been published that contain as their object the reduction of radiaion received by the user, such as EP-A-0588271, that discloses an apparatus provided with an asymmetric radiation antenna, or EP-A-0688478, EP-A-0689739 and EP-A-0669060, that describe cellular telephone apparatuses that incorporate physical elements for protection or shielding to avoid propagation of radiofrequency towards the user.

Specifically, EP-A-0669060 likewise suggests the possible noxious effects of electromagnetic wave radiation associated to the use of cellular telephones.

All these and other current measures to lessen the effect of radiofrequency and microwaves on cellular telephone users are clearly insufficient, given that the absolute physical proximity, currently necessary, of the receiver emitter elements and radiation emitters of the telephone with respect to the user's head in general, particularly hearing, brain and hand, do not stop the radiation that reaches the user, although lessened in intensity, from being of a high power density generated by the cellular telephone, that can be thousands of millions of times greater than the natural radiation level.

German document DE 295 08 792 U1 discloses a cellular telephone with a device to protect against radiation generated during its use of the aforesaid type, comprising a device for receiving electromagnetic radiofrequency waves and/or microwaves; a support handle for the user; a device for emitting electromagnetic radiofrequency waves and/or microwaves; an antenna; a speaker element; a microphone; a keypad; a screen and a casing, the said speaker element, the said microphone, the said screen and the said keypad forming a fixed group of elements, or personal communication group, solid to the casing of the cellular telephone, all this adapted in such a manner that during conversation, the personal communication group can be manipulated by the user contiguous to the same, spaced apart from any microwave emitter a distance sufficient so that the power density of the radiation energy that reaches the personal communication group, and therefore the user, is less than a predetermined maximum value.

On the other hand, DE 43 30 436 A1 discloses an embodiment of a like cell phone, in which communication is maintained in a cordless fashion.

The present invention has as object a cellular telephone apparatus that provides a solution to these drawbacks and that provides a high level of user health protection against the potential risks associated to electromagnetic radiation, produced from the now highly popular use of cellular telephones, assuring that the power density that reaches the user is the lowest possible, reducing it by more than 99% of current cellular telephone radiation.

EXPLANATION OF THE INVENTION

To this end, the object of the present invention is a cellular telephone with a device for protection against radiation generated during its use, of the aforesaid type, that in its essence its characterised in that it comprises a device for receiving electromagnetic radiofrequency waves and/or microwaves; a device for emitting electromagnetic radiofrequency waves and/or microwaves and an antenna forming a detachable group of elements, or radiation receiver-emitter group, which is provided with a user's handle, susceptible of being distanced apart from the personal communication group and communicating with the latter either in a cordless fashion or by a cable, the handle being telescopically extendable so that it can be held in the user's hand at a distance therefrom greater than 0.08 or 0.12 meters from the radiation receiver-emitter group, and the said radiation receiver-emitter group being able to be removably inserted in a snug manner in a housing provided for that purpose in the casing, all this adapted in such a manner that during communication, the radiation receiver-emitter group can be distanced from the personal communication group, which is susceptible of being distanced a sufficient distance apart so that the power density of the radiation energy that reaches the personal communication group, and therefore the user, is less to the said predetermined value, maintaining communication between the radiation receiver-emitter group and the personal communication group either through the said cable or wirelessly.

The said maximum value of the radiation power density that reaches the personal communication group can be less than 1 microW/cm$^2$ and preferable, in public spaces, less than 0.1 microW/cm$^2$.

The cellular phone according to the invention may advantageously comprise an emitted power measuring means.

In a cellular telephone usage system, consisting of a collective application, multiple personal communication groups share a single radiation receiver-emitter group that can be fixed in a casing adjacent to a building or to a public transport means inside of which there are a plurality of users, the telephone being specially adapted for collective application, via cordless communication by means of sensors communicated by a cable with a single receiver-emitter group.

In another cellular telephone usage system, particularly intended for an individual or personal application, the radiation receiver-emitter group having a handle for hand holding the first, can be fixed inside a compartment adjacent to a window or wall, radiation-permeable towards the exterior of the space where the user is, screened to reduce radiation diffusion in the direction of the user, the handle of the receiver-emitter group protruding from said compartment with the receiver-emitter group being placed inside the space.

The said space can be the compartment of an automobile, the compartment being accessible through a perforation made in the metal sheeting of the automobile roof, through which the handle of the radiation receiver-emitter group projects from within the compartment, connected via cable or cordless.

In such a case, the cellular phone can have a sleeve for the protection of the receiver-emitter group and its handle, which are detachably mounted, by magnetic means, to the automobile's roof and connected via cable or cordless with the user's personal communication group in a "hands-free set" fashion.

BRIEF DESCRIPTION OF THE DRAWINGS

There follows a description, in the form of preferred, although not exclusive, embodiments of the present invention, for the greater understanding of which some drawings are attached, provided merely as a non-limiting example, in which:

FIG. 1 is a frontal elevation view of a cellular telephone according to the invention;

FIG. 2 is a side elevation view of the cellular telephone in FIG. 1;

FIG. 6 is a section view illustrative of the working principle of the cellular telephone according to the individual application system, applied to an automobile, using a headset and cable or cordless connection between the radiation receiver-emitter group and the personal communication group, applicable to cellular telephones;

FIG. 7 is a schematic view that illustrates another form of individual application of the cellular telephone of the present invention, in which the radiation receiver-emitter group is protected, on the automobile roof, by a flexible case.

DETAILED DESCRIPTION OF THE DRAWINGS

Figure 3:
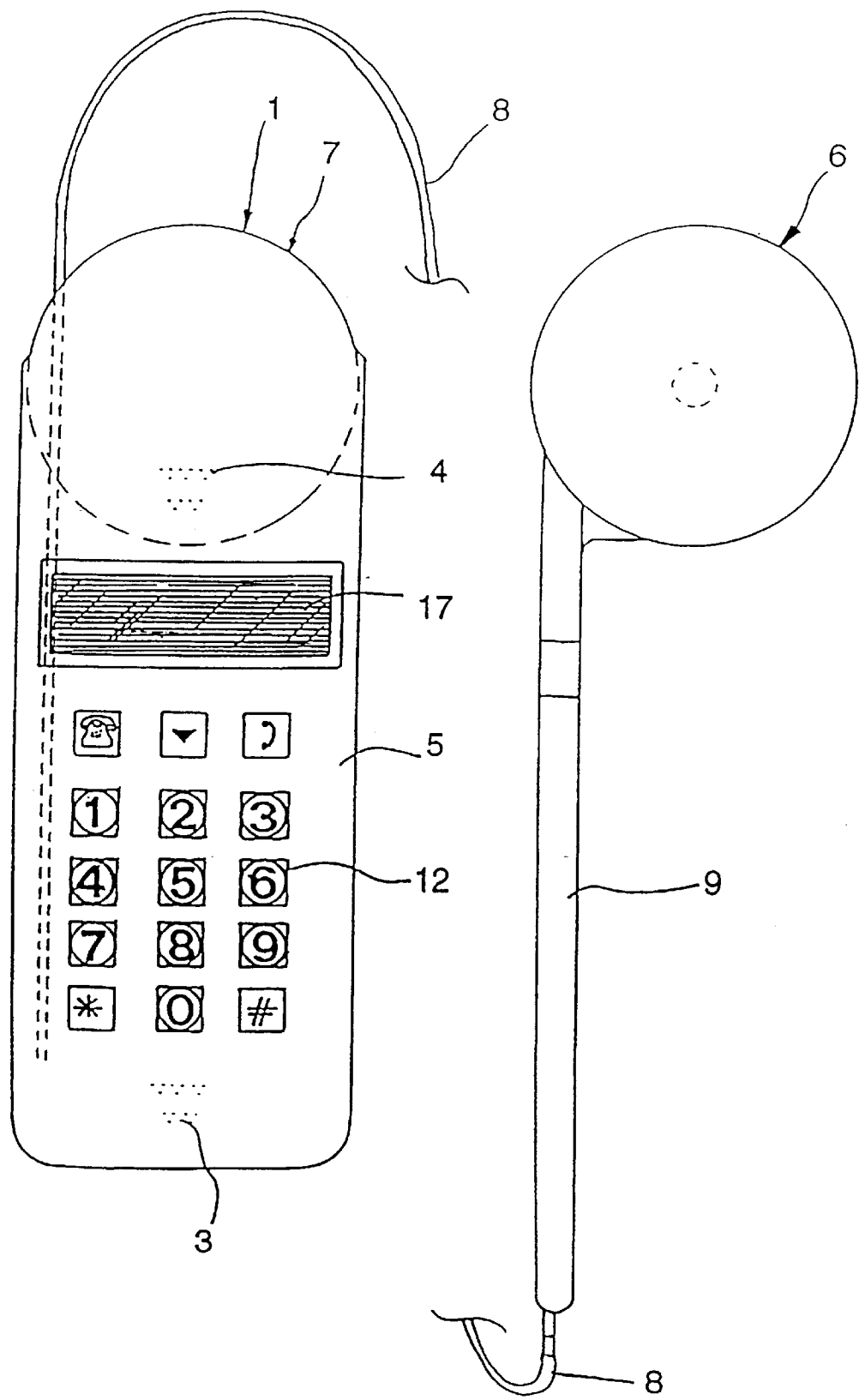
FIG. 3 is another frontal elevation view, that illustrates the cellular telephone in one of its possible working positions, with the handle telescopically extended.
Figure 5:
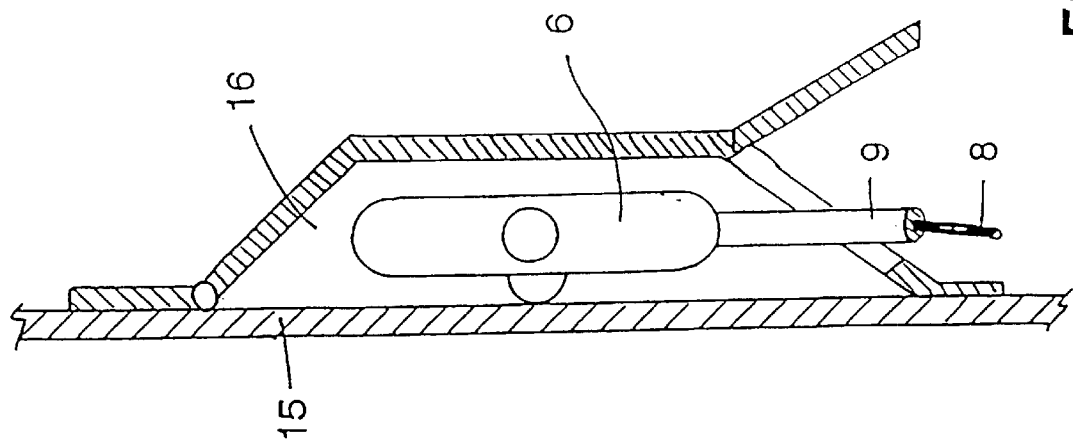
FIGS. 4 and 5 are each elevations, in section, and in plan that illustrate the housing for the radiation receiver-emitter group in a compartment provided for that purpose, distanced from the cellular telephone personal communication group.
Figure 4:
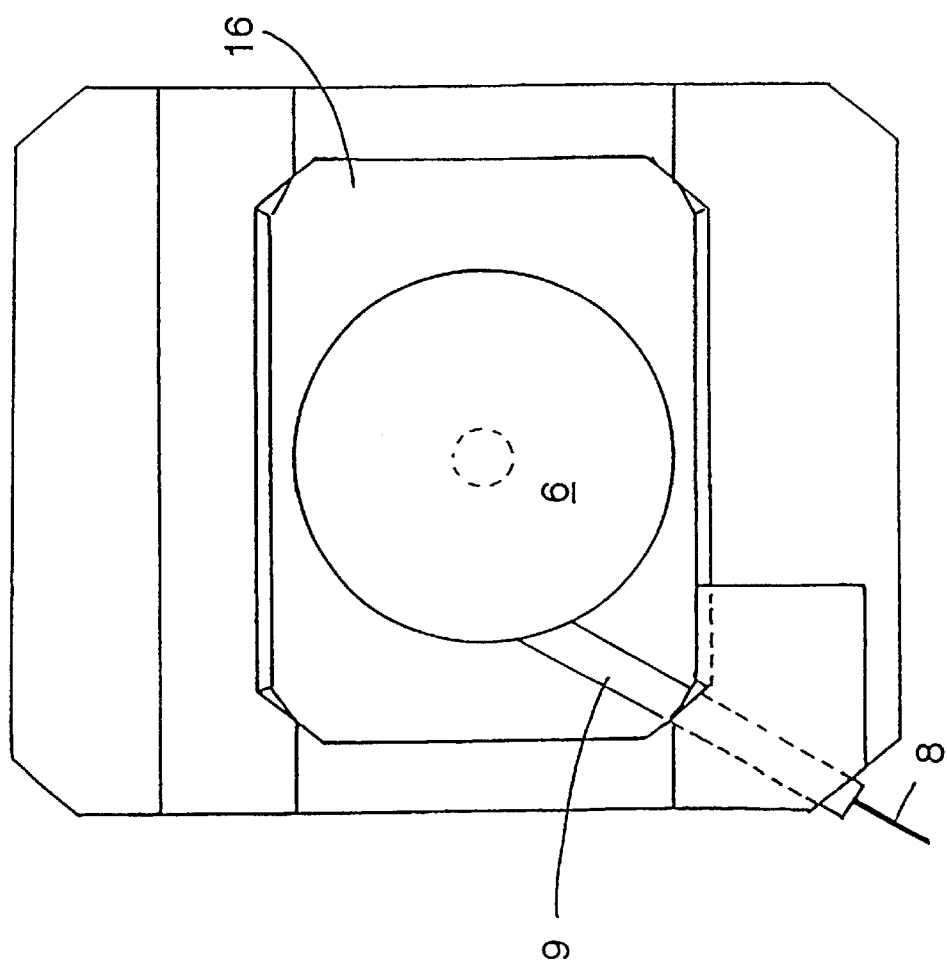

It can be seen in the said drawings that, as is well known, the cellular telephone 1 consists of a device for receiving electromagnetic radiofrequency waves and/or microwaves, a device for broadcasting electromagnetic radiofrequency waves and/or microwaves, an antenna 2, a speaker element 3, a microphone 4, a keypad 12, a handle 9, a casing 5 for the mechanical protection of the assembly, a screen 17 and a battery 13 or conventional power source. A protective shield and radiation projector, that is solid with the casing 5, completes the assembly and is adapted for the correct directing of the broadcast, electromagnetic radiation.

As principal characteristic of the cellular telephone 1 according to the present invention, the aforesaid elements are grouped in two groups 6, 7 of elements, separable between them.

A first group 6, named radiation receiver-emitter group consists of the receiver device, the emitter device, the antenna 2 and the handle 9, all of these elements solid among themselves.

The receiver device and the emitter device, since they are each well known, are not represented individually, integrated into the radiation receiver-emitter group 6.

The handle 9 is telescopically extendable, as can be seen in FIG. 3, in such a manner that the user's hand, on holding it at its end, remains at a distance from the radiation receiver-emitter group 6, that is always greater than the minimum security distance set by Table I.

The second group 7, named personal communication group, consists of the speaker element 3, the microphone 4, the screen 17, and the keypad 12 and is solid to the casing 5 of the cellular telephone 1.

In FIG. 2 it can be seen that the antenna 2 and the handle 9 project from the radiation receiver-emitter group 6, into which they are integrated. In the illustrated example, the said radiation receiver-emitter group 6 adopts an essentially discoidal shape.

The handle 9 of the radiation receiver-emitter group 6 is connected to the personal communication group 7, either via a connection cable 8, that at its other end is connected to the internal circuitry (not represented) of the communication group 7, solid with the casing 5 of the cellular telephone 1, or cordlessly connected in a well-known manner.

The cellular telephone 1 according to the present invention has two positions: a first rest position, shown specifically in FIGS. 1 and 2 and a working position, shown in FIGS. 3 to 7.

While the cellular telephone 1 is in the rest position, waiting or disconnected, the radiation receiver-emitter group 6 is coupled to the personal communication group 7, being housed in a concavity in the casing 5. In this rest position, the handle 9 is completely introduced into the casing 5 and the radiation receiver-emitter group 6 coupled firmly to the personal communication group 7, in such a manner that the cellular telephone entirety acquires the appearance of a traditional, mono-block cellular telephone.

In the rest position, the cable 8 is stored inside the casing 5 of the cellular telephone 1. Naturally, if the connection is cordless, that cable is non-existent, substituted by a cordless projector that can be directed.

When the user wants to make an outgoing call, answer an incoming call, or perform any other type of cellular telephone 1 use, to establish connection, the user only need extract the radiation receiver-emitter group 6 from the personal communication group 7, acquiring the working position shown in FIG. 3. The principal object of this is that the electromagnetic radiation generated in the first group 6 during the aforesaid establishment of connection reaches the user with a power density of radiation energy inversely proportional to the table of distance that separates the user from the first radiation receiver-emitter group 6, and reduced by more than 99% of the case of the radiation receiver-emitter group 6 being adjacent to the user's head.

FIGS. 6 and 7 illustrate one individual form of application of the cellular telephone 1 according to the invention. In this case, the radiation receiver-emitter group 6 is introduced during connection into an automobile 14 roof 15 (whose driver is the cellular telephone 1 user) of the invention.

In this application, the automobile 14 roof 15 sheeting creates a metallic shield that provides protection, additional to the implicit protection of separating both groups 6, 7, against radiation noxious to the user.

In the case of FIG. 6, the first group 6 is preferably placed inside a box 16' attached to the automobile roof. Specifically, this box 16' is adapted to house one, or several radiation receiver-emitter groups 6, each corresponding to a different user, and is accessible through a perforation in the automobile roof sheeting, from which the handle 9 projects, for easy use by the users. The material of the housing box 16' of the radiation receiver-emitter groups 6 is permeable to cellular telephone radiation.

In the case of FIG. 7, the radiation receiver-emitter group is placed within a flexible sleeve 21, that adapts to the shape of the radiation receiver-emitter group 6, which is fixed to the automobile roof by magnetic means 22.

In this manner, cellular telephone 1 use according to the principles of the present invention enables reduction of radiation in the user's direction and amplification in other directions, thereby improving communication performance. In both cases, the application allows the user to spatially orientate the group 6, in order to obtain the best possible transmission.

For a collective application of multiple cellular telephones 1 according to the invention, attached to a building 20, or to the chassis of a means of public transport, a single, collective, radiation receiver-emitter group 6 can be placed, to be shared by multiple users, each provided with a cellular telephone 1 provided with a personal communication group 7, and each with the possibility of connecting cordlessly to the central, collective, radiation receiver-emitter group 16.

Figure 8:
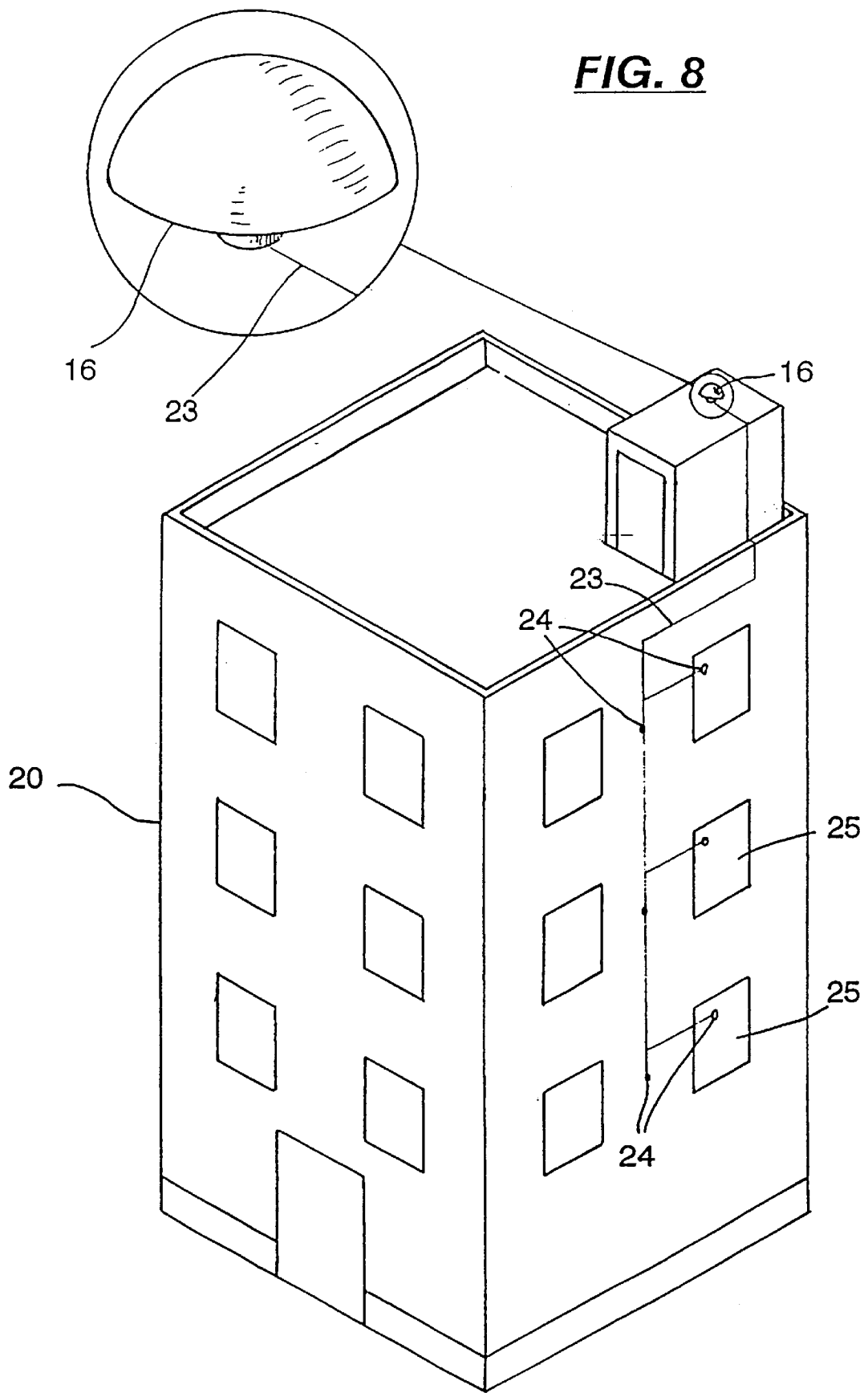
FIG. 8 is a perspective view that illustrates one mode of collective application of the cellular telephone, according to the present invention in a construction or building provided with internal cordless sensors.

FIG. 8 illustrates an example of collective application in which the central, collective, radiation receiver-emitter group 16 is placed on the highest part of a building 20, connected via cabling 23 with multiple cordless receiver sensors 24, each one connected cordlessly to its respective personal communication group 7. The sensors 24 can be installed either in the windows 25, or in the wall of the building 20, in which case some openings in the construction allow access to the corresponding sensors 24.

Preferably, the cellular telephone 1 according to the invention is provided with some measuring means of the power broadcast.

To dimension the holding handle, an expert in the art can calculate the dimensions easily by application of the power flow formula:

$$\Phi = \frac{Pire(W)}{4\pi d(m)^2} \times \frac{1}{l_{wxt}} (W/m^2),$$

So that the power flow density that reaches the user, who holds the handle 9 of the receiver-emitter group 6, fixed in the external part of the space, both for the individual and collective application, is less than 1 microW/cm$^2$, and preferably less than 0.1 micro W/cm$^2$.

The nature of the present invention being sufficiently described, as well as the means of putting it into practice, it is hereby stated that as long as the fundamental concept is not altered, changed or modified, it may undergo variations in detail.

In this sense, the shape, constitution and materials of the constituent elements of the cellular telephone can be any, remaining independent of the scope of the invention. Specifically, the handle 9 can be simple or multiple and open or closed capricious shapes, to ease the grasp and handling distant from the user.

Likewise, the shape of the radiation receiver-emitter group 6 can be different from that explained and illustrated in the drawings, always where the principles of the present invention are respected.

It is likewise worthy of note that, obviously, the housing box 16' for the radiation receiver-emitter group 6 could also be inside the vehicle interior 10. Likewise, the fact that the group 6 can be placed in a box 16' or housing for that purpose is applicable to the interiors different from that of an automobile, for example, in a means of public transport, such as a bus or a train, or else in a room of a dwelling, office, shop or similar. All this does not affect the scope of the inventive concept.

Lastly, although in FIG. 7 there is a schematic illustration of a collective application of the telephone according to the invention whether building 19 of dwellings and/or offices, it should be understood that the said building could also be a train carriage or the chassis of a bus, for example, without this affecting the scope of the invention.

The principal concept and that for which a patent of invention, for twenty years, is applied for, is that which is summarised in the following claims.

What is claimed is:

1. Cellular telephone (1) with a device to protect against radiation generated during its use, of the type comprising a speaker element (3); a microphone (4); a keypad (12); a screen (17) and a casing (5), the said speaker element, the said microphone, the said screen and the said keypad forming a fixed group (7) of elements, or personal communication group, solid to the casing (5) of the cellular telephone (1), all this adapted in such a manner that during conversation, the personal communication group (7) can be manipulated by the user contiguous to the same, spaced apart from any microwave emitter a distance sufficient so that the power density of the radiation energy that reaches the personal communication group (7), and therefore the user, is less than a predetermined maximum value, maintaining communication in a cordless fashion, characterised in that it comprises a device for receiving electromagnetic radiofrequency waves and/or microwaves; a device for emitting electromagnetic radiofrequency waves and/or microwaves and an antenna (2) forming a detachable group (6, 16) of elements, or radiation receiver-emitter group, which is provided with a user's handle (9), susceptible of being distanced apart from the personal communication group (7) and communicating with the later either in a cordless fashion or by a cable (8), the handle being telescopically extendable so that it can be held in the user's hand at a distance therefrom greater than 0.08 or 0.12 meters from the radiation receiver-emitter group, and the said radiation receiver-emitter group (6) being able to be removably inserted in a snug manner in a housing provided for that purpose in the casing (5), all this adapted in such a manner that during communication, the radiation receiver-emitter group can be distanced from the personal communication group (7), which is susceptible of being distanced a sufficient distance apart so that the power density of the radiation energy that reaches the personal communication group, and therefore the user, is less to the said predetermined value, maintaining communication between the radiation receiver-emitter group and the personal communication group either through the said cable (8) or wirelessly.

2. Cellular phone (1) according to claim 1, characterised in that the said maximum value of the radiation power density that reaches the personal communication group (7) can be less than 1 microW/cm$^2$ and preferable, in public spaces, less than 0.1 microw/cm$^2$, and in that it comprises an emitted power measuring means.

3. Cellular phone (1) according to claim 1, characterised in that the multiple personal communication groups (7) share a single radiation receiver-emitter group (16) that can be fixed in a casing adjacent to a building (20) or to a public transport means inside of which there are a plurality of users, the telephone being specially adapted for collective application, via cordless communication by means of sensors (24) communicated by a cable (23) with a single receiver-emitter group (16).

4. Cellular phone (1) according to claim 1, specially intended for an individual application, characterised in that the radiation receiver-emitter group (6) having a handle (9) for hand holding the first, can be fixed inside a compartment adjacent to a window or wall, radiation-permeable towards the exterior of the space (10) where the user is, screened to reduce radiation diffusion in the direction of the user, the handle (9) of the receiver-emitter group (6) protruding from the said compartment with the receiver-emitter group being placed inside the space (10).

5. Cellular phone (1) according to claim 4, characterised in that, being the said space (10) the compartment of an automobile, the compartment is accessible through a perforation made in the metal sheeting of the automobile roof, through which the handle (9) of the radiation receiver-emitter group (6) projects from within the compartment, connected via cable or cordless.

6. Cellular phone (1) according to claim 5, characterised in that it has a sleeve (21) for the protection of the receiver-emitter group (6) and its handle (9), which are detachably mounted, by magnetic means, to the automobile's roof and connected via cable or cordless with the user's personal communication group (7) in a "hands-free set" fashion.

* * * * *